United States Patent
Thompson

(10) Patent No.: US 9,345,202 B2
(45) Date of Patent: May 24, 2016

(54) GROUND-EMBEDDABLE PLANT SURROUND HAVING A WEED-ABATEMENT COLLAR

(71) Applicant: Dallas Ray Thompson, Payson, UT (US)

(72) Inventor: Dallas Ray Thompson, Payson, UT (US)

(*) Notice: Subject to any disclaimer, the term of this patent is extended or adjusted under 35 U.S.C. 154(b) by 61 days.

(21) Appl. No.: 14/269,061

(22) Filed: May 2, 2014

(65) Prior Publication Data

US 2014/0325903 A1 Nov. 6, 2014

Related U.S. Application Data

(60) Provisional application No. 61/818,528, filed on May 2, 2013.

(51) Int. Cl.
*A01G 9/10* (2006.01)

(52) U.S. Cl.
CPC ........................... *A01G 9/102* (2013.01)

(58) Field of Classification Search
CPC ........................................ A01G 9/102
USPC ............. 47/48.5, 32.4, 32.5, 32.6, 32.7, 32.8, 47/29.6, 29.7, 41.1
See application file for complete search history.

(56) References Cited

U.S. PATENT DOCUMENTS

| | | | | |
|---|---|---|---|---|
| 1,880,136 A * | 9/1932 | Hickok | ............ | A01G 9/102 47/77 |
| 2,784,528 A | 3/1957 | Rudenauer | | |
| 2,943,732 A * | 7/1960 | Kovaleski | ............ | B65D 85/04 206/303 |
| 3,081,023 A * | 3/1963 | Taylor | ............ | A47G 29/1201 211/10 |
| 3,683,549 A * | 8/1972 | Simmon | ............ | A01G 9/027 220/23.4 |
| 4,108,439 A * | 8/1978 | McGuire | ............ | B05B 15/001 172/19 |
| 4,231,186 A * | 11/1980 | Ruuska | ............ | A01G 9/104 111/100 |
| 4,612,726 A * | 9/1986 | Mori | ............ | A01G 9/00 47/17 |
| 5,241,784 A | 9/1993 | Henry | | |
| D364,322 S | 11/1995 | Breacain | | |
| 5,465,526 A * | 11/1995 | Langley | ............ | A01G 1/08 47/33 |
| 5,647,169 A * | 7/1997 | Bui | ............ | A01G 13/10 47/33 |
| 7,228,813 B2 * | 6/2007 | Flamingo | ............ | E01F 9/0122 116/63 C |
| 2002/0005011 A1 * | 1/2002 | Goldberg | ............ | A01G 9/028 47/65.5 |
| 2014/0298718 A1 * | 10/2014 | Gooden | ............ | A01G 29/00 47/32.7 |

* cited by examiner

*Primary Examiner* — Kristin C Hayes
*Assistant Examiner* — Ebony Evans
(74) *Attorney, Agent, or Firm* — Angus C. Fox, III

(57) ABSTRACT

This invention provides a truncated, ground-embeddable conical irrigation ring having an integral weed-abatement collar. The slight conical nature of the ring allows for nested stacking of the devices. A first embodiment device has an annular collar with a circular outer perimeter. The weed-abatement collar is wide enough to prevent most weeds from beginning growth outside the ring, creeping over the edge thereof, and into the plant growing region within the ring. The ring prevents water that is provided to a plant growing within the ring from seeping outwardly into soil were no plant growth is wanted. A second embodiment has a hexagonally-shaped weed-abatement collar that allows for honeycomb arrangements of multiple devices which completely cover the ground between irrigation rings. A third embodiment also has a hexagonally-shaped weed-abatement collar. Half of the collar perimeter is equipped with a light-blocking underlapping shelf.

13 Claims, 6 Drawing Sheets

GROUND-EMBEDDABLE PLANT SURROUND HAVING A WEED-ABATEMENT COLLAR

BACKGROUND OF THE INVENTION

1. Field of the Invention

This invention relates, generally, to irrigation rings and weed-abatement devices. More particularly, it relates to an irrigation ring that is integral with a weed-abatement collar.

2. History of the Prior Art

Proper watering of plants, bushes and trees presents a serious problem in areas of the world where potable water is scarce. Development of the south-western portion of the United States was facilitated through the transport of water hundreds of miles from the Owens Valley using aqueducts, canals and pumping stations. Water from the Colorado River has been used to develop the entire Las Vegas metropolitan area. With the dramatic increase in population the world has experienced during the last sixty years, potable water is becoming increasingly scarce, and increased efficiency of use is of the utmost importance. The common practice of sprinkling the general area where plants are growing is very wasteful from the standpoint of water conservation. Because proper watering of plants requires the water penetrate deep enough to reach the root structure, sprinkling must be continued for several hours. Such practice leads to the loss of much water through evaporation and runoff. It has long been known that if the area watered can be limited to only the ground where plant root structures are found, dramatic water savings will result. Irrigation systems in the nation of Israel take advantage of this knowledge, with drip irrigation being the norm.

U.S. Pat. No. 2,784,528 to Arthur B. Rudenauer discloses an irrigating ring which is embeddable in the ground around a plant. The ring, which is made of metal, is comprised of two halves which are held together with springs. An irrigation nozzle is penetrates one of the halves.

U.S. Pat. No. D364,322 to Stephen Breacain discloses plant water ring that appears to be embeddable in the soil and appears to be made of a polymeric material.

U.S. Pat. No. 5,241,784 to Elona I. Henry discloses a plant root container and a method of air root pruning. The device is generally cylindrical in shape, with a corrugated sidewall having a plurality of apertures therein.

SUMMARY OF THE INVENTION

This invention provides a truncated, ground-embeddable conical irrigation ring having an integral weed-abatement collar. The slight conical nature of the ring allows for nested stacking of the devices. Several embodiments are envisioned. The first embodiment has an annular collar with a circular outer perimeter. The weed-abatement collar is wide enough to prevent weeds—other than those which send out above-ground runners—from beginning growth outside the ring, creeping over the edge thereof, and into the plant growing region within the ring. The ring prevents water that is provided to a plant growing within the ring from seeping outwardly into soil were no plant growth is wanted. The second embodiment has a hexagonally-shaped weed-abatement collar that allows for honeycomb arrangements of multiple devices which completely cover the ground between irrigation rings. The third embodiment has also has a hexagonally-shaped weed-abatement collar.

DETAILED DESCRIPTION OF THE PREFERRED EMBODIMENT

The invention will now be described with reference to the included drawing figures, which are representative of the three embodiments of the new ground-embeddable plant surround. The various embodiments of the plant surround are intended to be embedded within the ground so that only the weed-abatement collar is above ground level.

Figure 1:
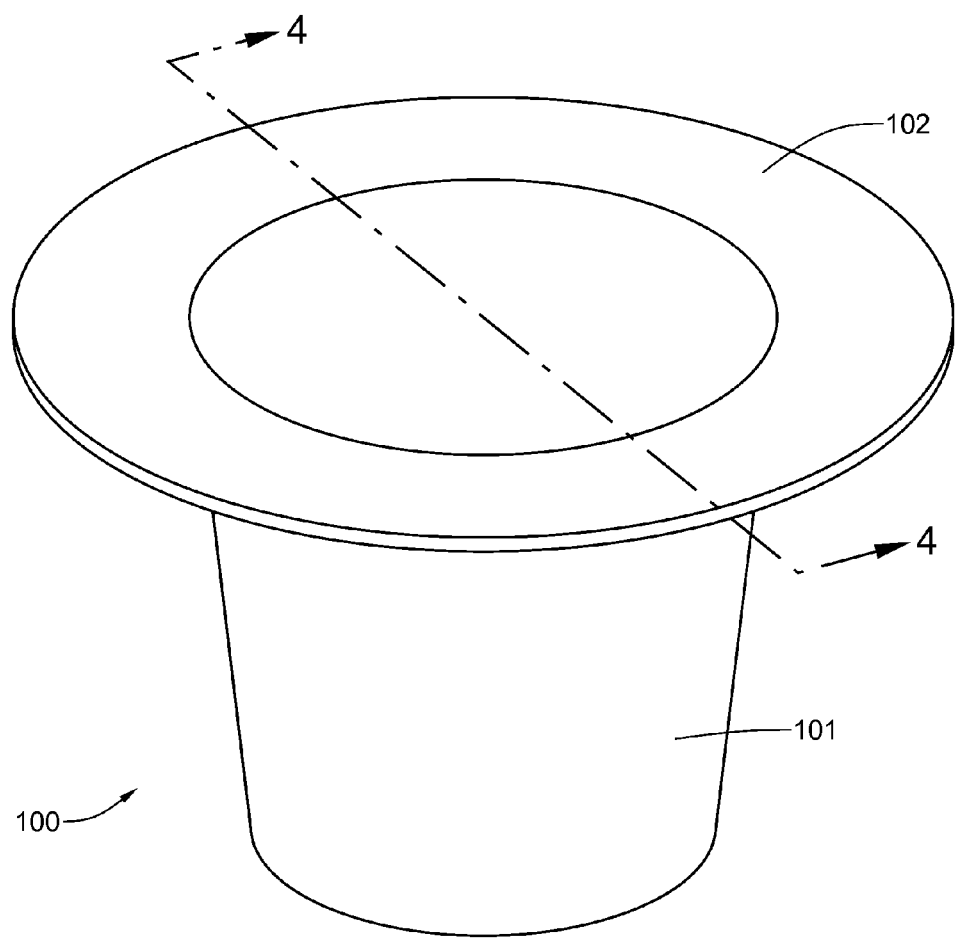
FIG. 1 is an isometric view of a first embodiment plant surround having an integral, annular weed-abatement collar.
Figure 4:
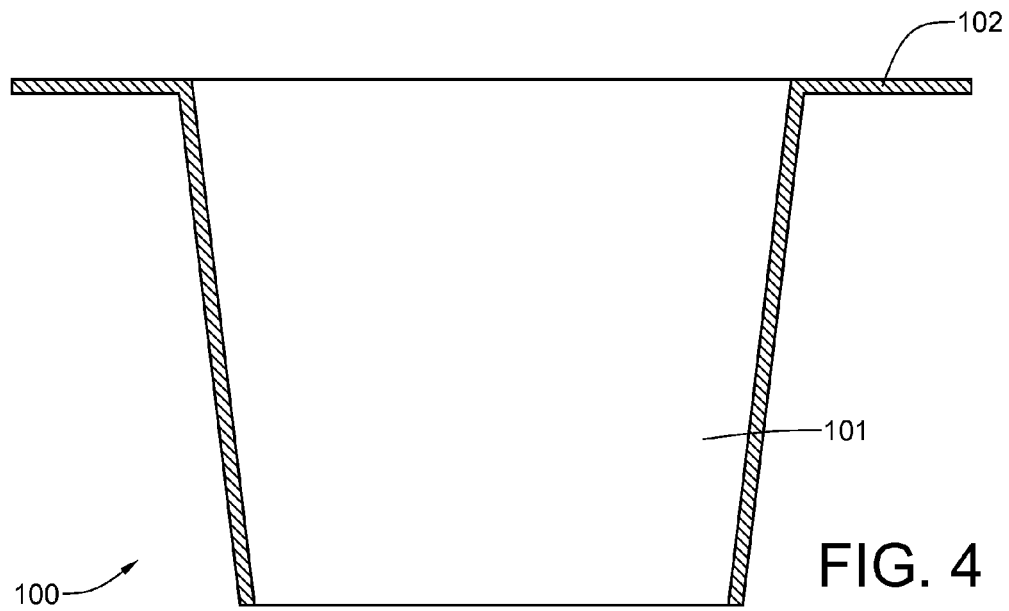
FIG. 4 is a cross-sectional view of the first embodiment plant surround taken through section line 4-4 of FIG. 1.

Referring now to FIGS. 1 and 4, a first embodiment plant surround 100 has a truncated conical ground-embeddable irrigation ring 101 with an integral, annular weed-abatement collar or flange 102.

Figure 2:
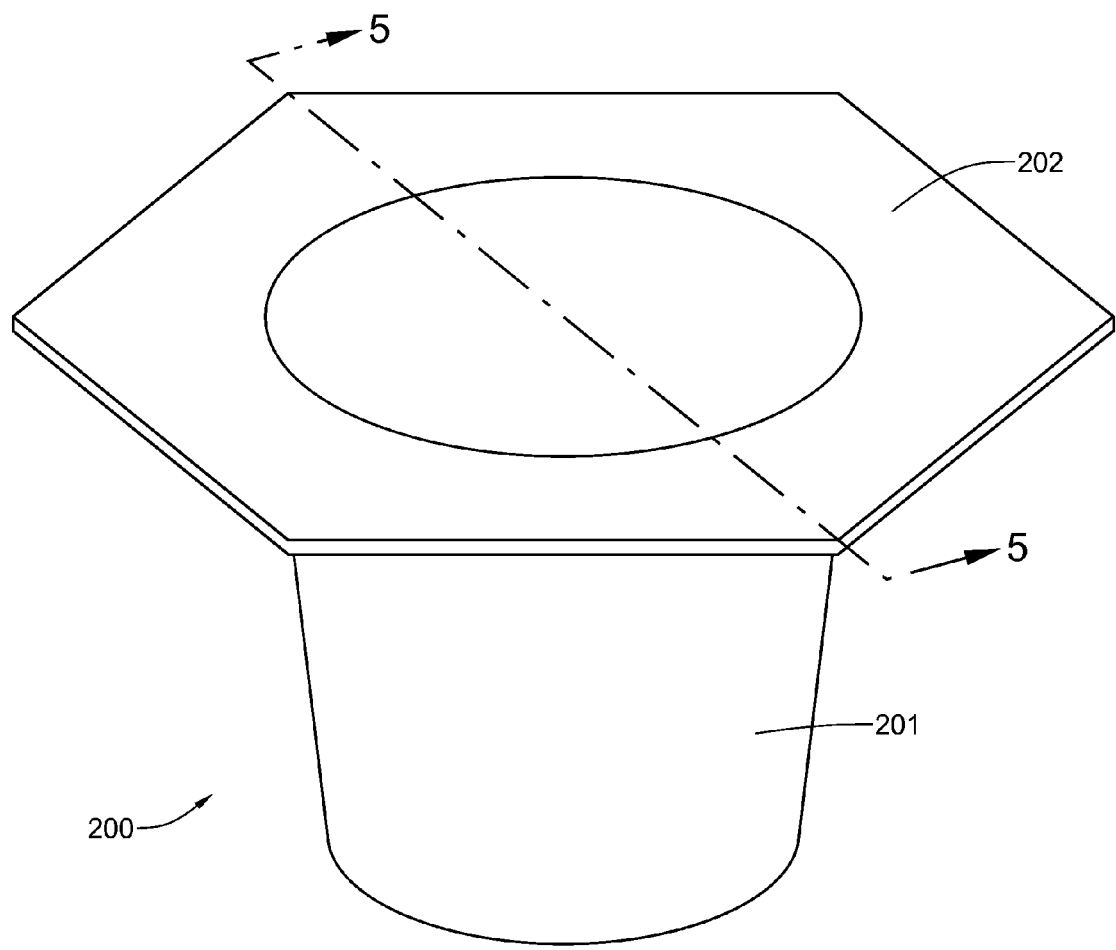
FIG. 2 is an isometric view of a second embodiment plant surround having an integral, hexagonally-shaped weed-abatement collar.
Figure 5:
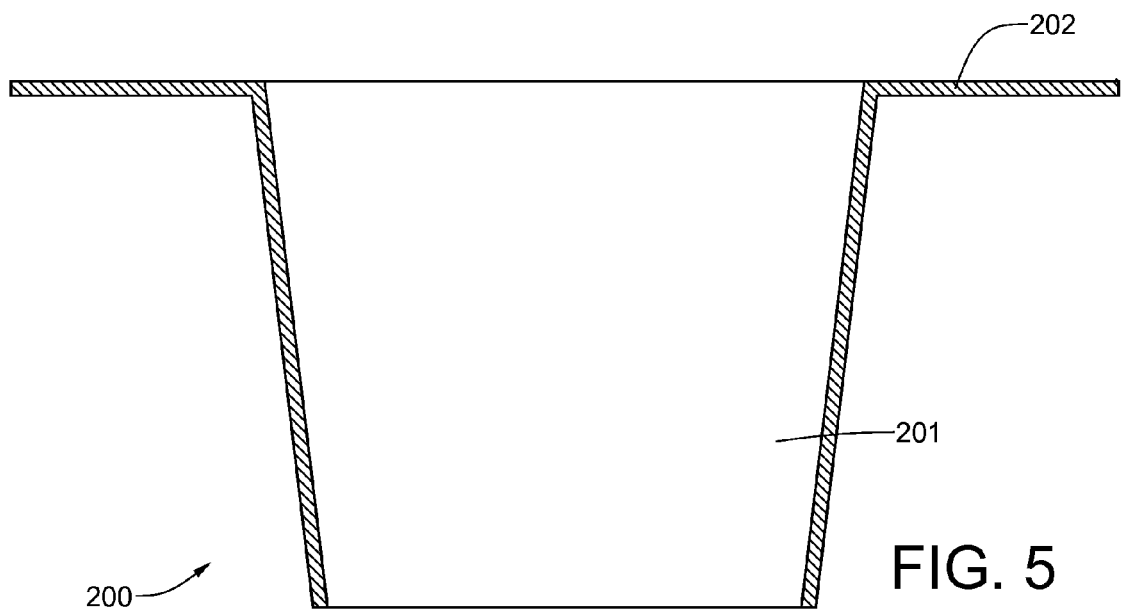
FIG. 5 is a cross-sectional view of the second embodiment plant surround taken through section line 5-5 of FIG. 2.

Referring now to FIGS. 2 and 5, a second embodiment plant surround 200 has a truncated conical ground-embeddable irrigation ring 201 with an integral, regular-hexagonally-shaped weed-abatement collar 202.

Figure 3:
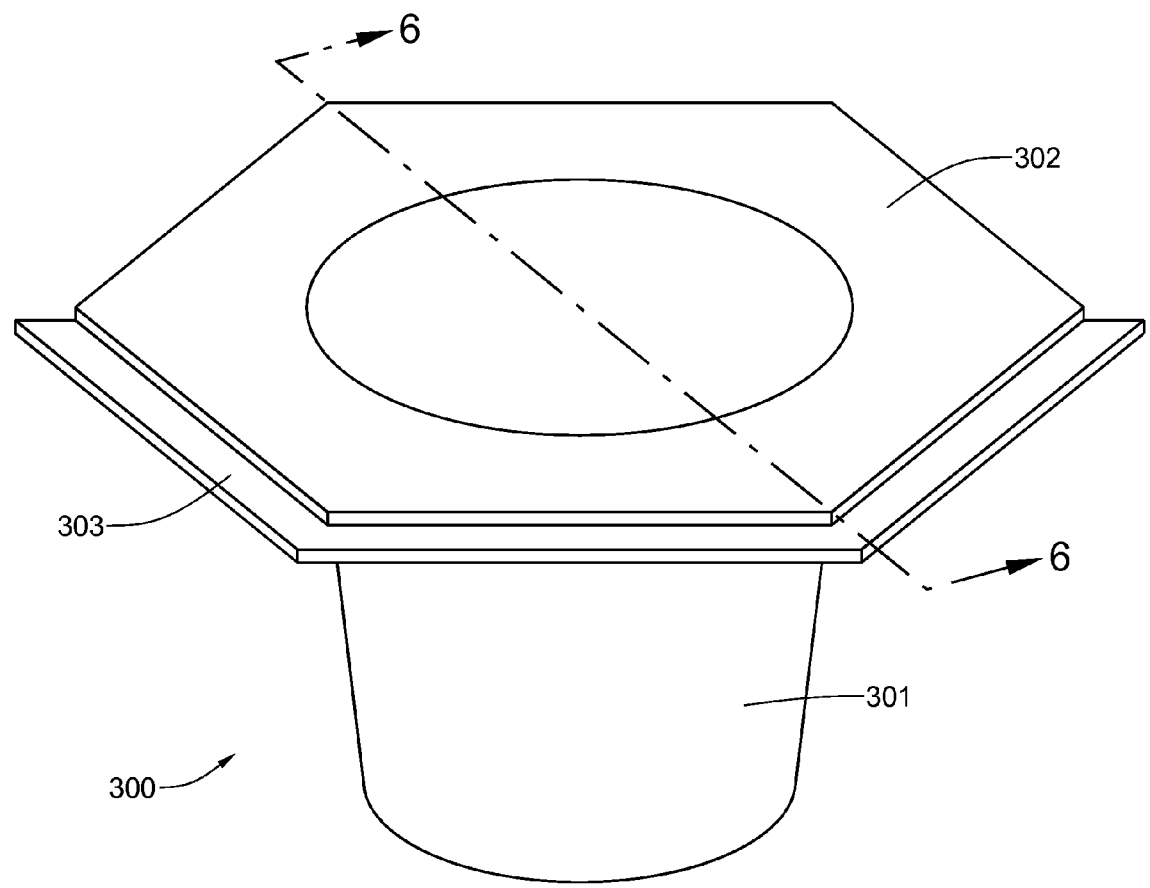
FIG. 3 is an isometric view of a third embodiment plant surround having an integral, hexagonally-shaped weed-abatement collar with half of the collar's perimeter equipped with an underlapping shelf.
Figure 6:
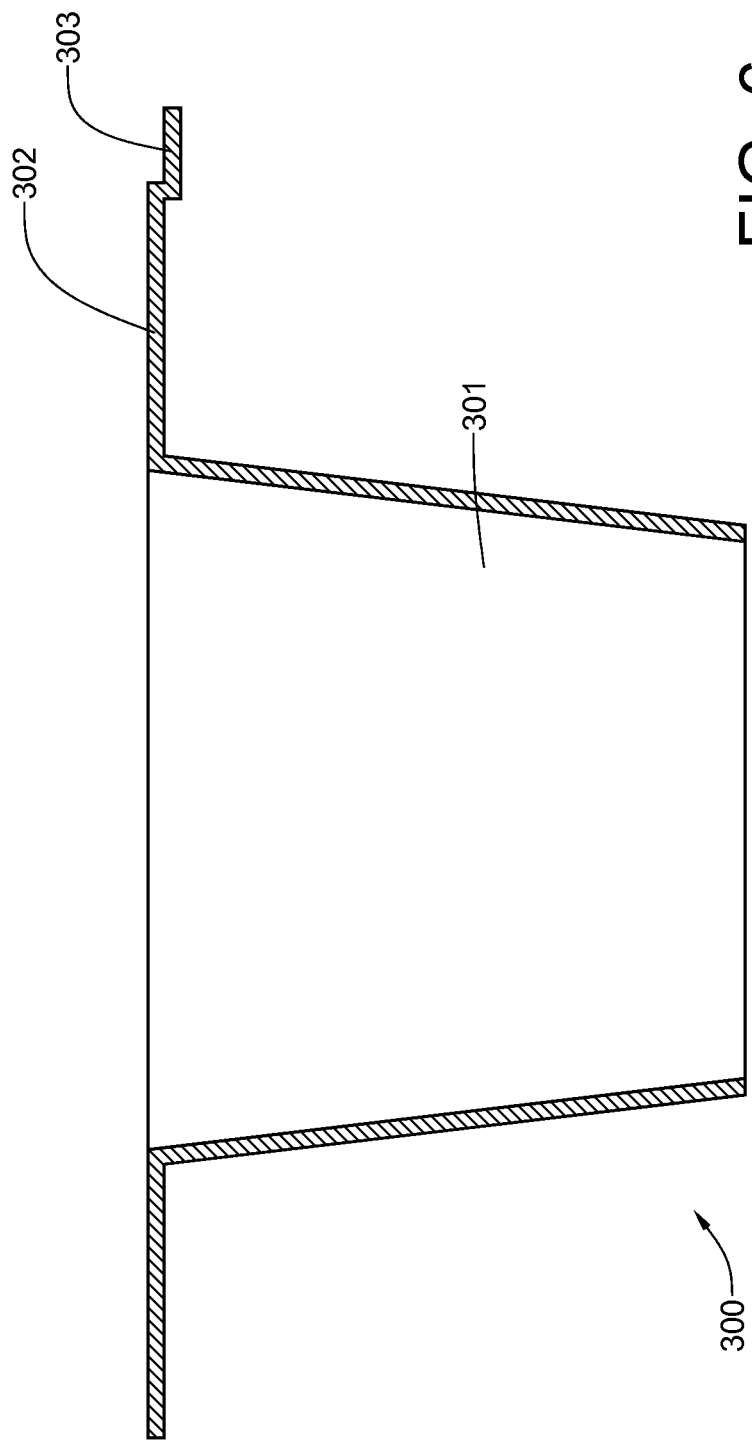
FIG. 6 is a cross-sectional view of the third embodiment plant surround taken through section line 6-6 of FIG. 3.

Referring now to FIGS. 3 and 6, a third embodiment plant surround 300 has a truncated conical ground-embeddable irrigation ring 301 with an integral, regular-hexagonally-shaped weed-abatement collar 302. Half of the collar perimeter, consisting of three contiguous sides of the hexagon, is equipped with an underlapping shelf 303 that completely seals out light from the non-planted areas between irrigation rings in a honeycomb arrangement of multiple devices. The preferred method of arranging multiple third embodiment plant surrounds is to orient all of them so the underlapping shelves 303 all face the same direction. Although multiple second embodiment plant surrounds 200 can also be positioned in a honeycomb arrangement, the cracks between outer adjacent edges of abutting plant surrounds are not sealed. Although black electrical tape may be used to seal the abutting edges of two adjacent plant surrounds, it is much easier to use the third embodiment plant surrounds 300, which automatically seal the abutting edges.

Figure 7:
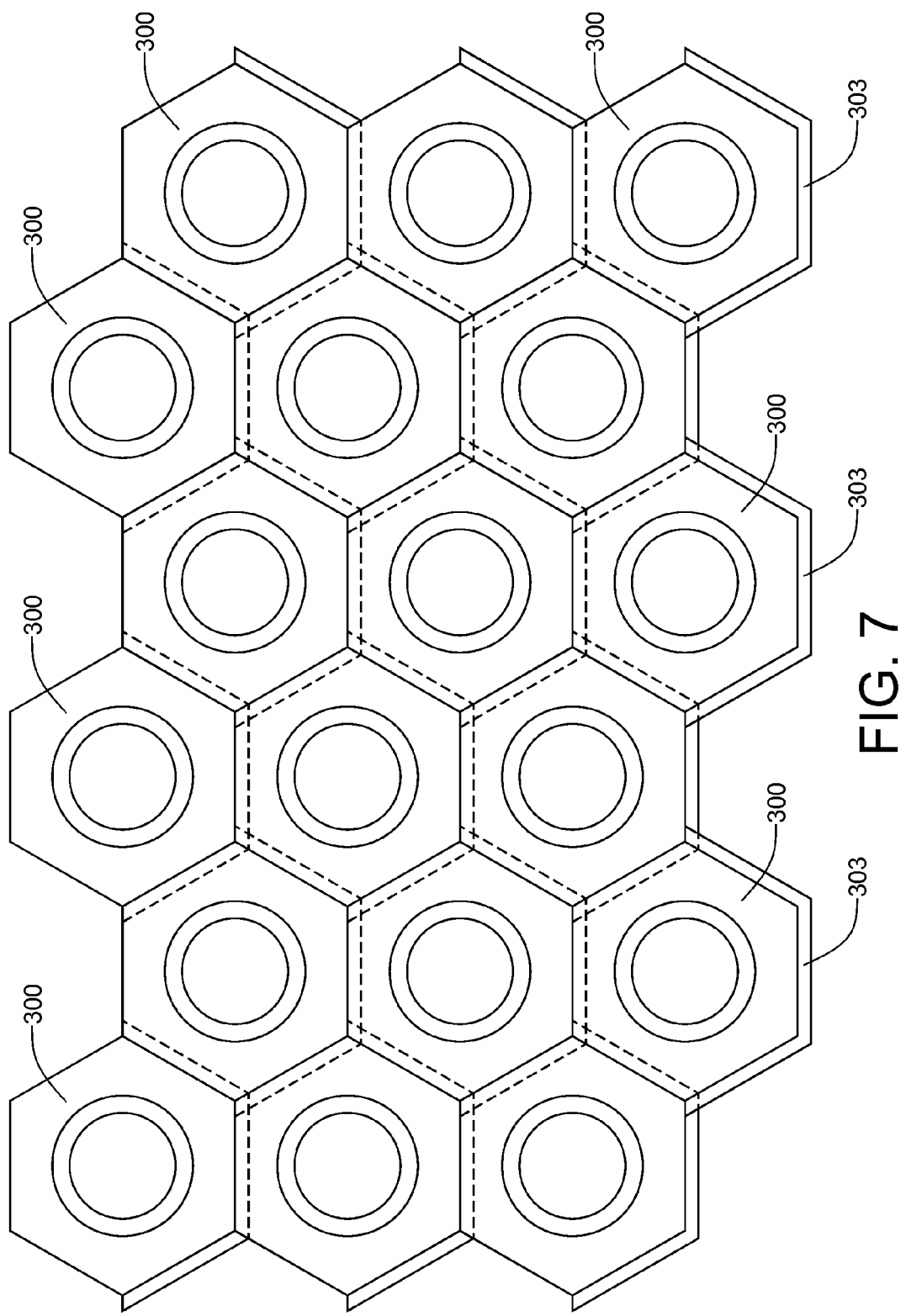
FIG. 7 is a top plan view of eighteen third embodiment plant surrounds positioned in a honeycomb arrangement.

Referring now to FIG. 7, eighteen of the third embodiment plant surrounds 300 have been positioned in a honeycomb arrangement. It will be noted that, if all of the underlaping shelves 303 are facing the same direction (in this case, toward the bottom of the page), there is complete overlap of all adjoining edges of the hexagonal collars. With the irrigation ring 301 and weed-abatement collar 302 of the plant surround 300 manufactured from opaque, light-blocking material, this arrangement effectively prevents sunlight from impinging on the ground between the irrigation rings 300. This feature will prevent the seeds of weeds from germinating at the joints between adjacent plant surrounds.

Each of the embodiments of the plant surround 100, 200 and 300 is nestable and stackable with a plurality of other identical plant surrounds. In addition, each of the embodiments of the plant surround 100, 200 and 300 is open at the bottom, thereby allowing the root system of the plant to grow out the bottom of the irrigation ring 101, 201 or 301 as the plant matures. The irrigation ring keeps water that is provided to the plant within the cylindrical structure, thereby reducing the amount of water required to maintain the health of a plant that is planted within the plant surround.

The various embodiments of the plant surround can be manufactured from structural polymeric thermoplastic or thermo-setting resins. Such resins include high-density polyethylene (HDPE), low-density polyethylene (LDPE), polypropylene (PP), polystyrene (PS), acrylonitrile butadiene styrene (ABS), and polyvinylchloride (PVC). Decorative designs may be molded into the upper surface of the weed-abatement collar to enhance the aesthetic appearance of the plant surround.

Although only three embodiments of the invention have been shown and described, it will be obvious to those having ordinary skill the art that changes and modifications may be made thereto without departing from the scope and the spirit of the invention as may be hereinafter claimed.

What is claimed is:

1. A ground-embeddable plant surround comprising:
   a downwardly-tapering, truncated conical ground-embeddable irrigation ring; and
   a weed-abatement collar configured as a regular hexagonal laminar flange that is both centered about the irrigation ring and unitary with an uppermost portion of the irrigation ring, said hexagonal laminar flange having three mutually-contiguous sides equipped with an underlapping shelf.

2. The ground-embeddable plant surround of claim 1, wherein said plant surround is nestable and stackable with at least one other identical plant surround.

3. The ground-embeddable plant surround of claim 1, wherein said plant surround is nestable and stackable with a plurality of other identical plant surrounds.

4. The ground-embeddable plant surround of claim 1, wherein said regular hexagonal laminar flange enables a honeycomb arrangement of multiple devices plant surrounds, said arrangement characterized as having ground surfaces between adjacent ground-embedded irrigations rings completely covered, with complete overlap of all joints between adjacent weed abatement collars.

5. The ground-embeddable plant surround of claim 1, wherein said irrigation ring and said weed-abatement collar are made from materials selected from the group consisting of thermoplastic and thermo-setting polymeric plastic resins.

6. The ground-embeddable plant surround of claim 1, wherein said irrigation ring and said weed-abatement collar are made from materials selected from the group consisting of high-density polyethylene, low-density polyethylene, polypropylene, polystryrene, acrylonitrile butadiene styrene, and polyvinylchloride.

7. A ground-embeddable plant surround comprising:
   a downwardly-tapering, truncated conical ground-embeddable irrigation ring fully open at top and bottom; and
   a weed-abatement collar configured as a regular hexagonal laminar flange that is both centered about the irrigation ring and unitary with an uppermost portion of the irrigation ring, said hexagonal laminar flange having three mutually-contiguous sides equipped with an underlapping shelf.

8. The ground-embeddable plant surround of claim 7, wherein said plant surround is nestable and stackable with a plurality of other identical plant surrounds.

9. The ground-embeddable plant surround of claim 7, wherein said underlapping shelf is of generally uniform width.

10. The ground-embeddable plant surround of claim 7, wherein multiple plant surrounds are configurable in a honeycomb arrangement in which ground surfaces between weed abatement collars are completely covered, with complete overlap of all joints between adjacent weed abatement collars.

11. The ground-embeddable plant surround of claim 7, wherein said irrigation ring and said weed-abatement collar are made from materials selected from the group consisting of thermoplastic and thermo-setting polymeric plastic resins.

12. The ground-embeddable plant surround of claim 7, wherein said irrigation ring and said weed-abatement collar are made from materials selected from the group consisting of high-density polyethylene, low-density polyethylene, polypropylene, polystryrene, acrylonitrile butadiene styrene, and polyvinylchloride.

13. The ground-embeddable plant surround of claim 7, wherein said irrigation ring and said weed-abatement collar are made from opaque, light-blocking materials.

* * * * *